United States Patent
Bhide et al.

(10) Patent No.: US 11,106,864 B2
(45) Date of Patent: *Aug. 31, 2021

(54) COMMENT-BASED ARTICLE AUGMENTATION

(71) Applicant: International Business Machines Corporation, Armonk, NY (US)

(72) Inventors: Manish Anand Bhide, Hyderabad (IN); Nishtha Madaan, Hisar (IN); Seema Nagar, Bangalore (IN); Sameep Mehta, New Delhi (IN); Kuntal Dey, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 32 days.

This patent is subject to a terminal disclaimer.

(21) Appl. No.: 16/361,385

(22) Filed: Mar. 22, 2019

(65) Prior Publication Data

US 2020/0302005 A1    Sep. 24, 2020

(51) Int. Cl.
| | |
|---|---|
| *G06F 40/00* | (2020.01) |
| *G06F 40/169* | (2020.01) |
| *G06F 16/2457* | (2019.01) |
| *G06F 40/117* | (2020.01) |
| *G06F 40/197* | (2020.01) |

(52) U.S. Cl.
CPC ...... *G06F 40/169* (2020.01); *G06F 16/24578* (2019.01); *G06F 40/117* (2020.01); *G06F 40/197* (2020.01)

(58) Field of Classification Search
CPC .............................. G06F 40/169; G06F 40/30
See application file for complete search history.

(56) References Cited

U.S. PATENT DOCUMENTS

| | | | |
|---|---|---|---|
| 7,599,938 B1 | 10/2009 | Harrison, Jr. | |
| 9,189,540 B2* | 11/2015 | Hailpern | ................ G06F 16/35 |
| 9,767,206 B2* | 9/2017 | Markson | ............ G06F 16/9535 |
| 2006/0168510 A1* | 7/2006 | Bryar | ................... G06F 40/131 |
| | | | 715/229 |
| 2009/0319518 A1 | 12/2009 | Koudas et al. | |
| 2010/0030798 A1 | 2/2010 | Kumar et al. | |

(Continued)

FOREIGN PATENT DOCUMENTS

EP          2778977 A1     9/2014

OTHER PUBLICATIONS

Bulut, "TopicMachine: Conversion Prediction in Search Advertising Using Latent Topic Models," IEEE Transactions on Knowledge and Data Engineering, vol. 26, No. 11, Nov. 2014, p. 2846-2858. (Year: 2014).*

(Continued)

*Primary Examiner* — Amelia L Tapp
(74) *Attorney, Agent, or Firm* — Kelsey M. Skodje

(57) ABSTRACT

An article is automatically augmented. The article and one or more comments are received. Comment elements are extracted from the one or more comments, and article elements are extracted from the article. Alignment scores are generated for comment-article pairs based on the extracted comment and article elements. Further, it is determined that at least one comment-article pair has an alignment score at or above a threshold alignment score. At least one augmentation feature is then generated.

16 Claims, 5 Drawing Sheets

(56) References Cited

U.S. PATENT DOCUMENTS

| | | | |
|---|---|---|---|
| 2010/0095198 A1 | 4/2010 | Bultrowicz et al. | |
| 2012/0173508 A1* | 7/2012 | Zhou | G06F 16/951 |
| | | | 707/709 |
| 2015/0058358 A1* | 2/2015 | Xu | G06F 16/335 |
| | | | 707/748 |
| 2017/0034107 A1 | 2/2017 | Krishnaswamy et al. | |
| 2017/0249384 A1* | 8/2017 | Kandylas | G06F 16/334 |
| 2018/0145934 A1* | 5/2018 | Pappu | H04L 12/1822 |
| 2018/0165262 A1 | 6/2018 | Biswas et al. | |
| 2018/0239833 A1 | 8/2018 | Zholudev et al. | |
| 2018/0276561 A1* | 9/2018 | Pasternack | G06N 20/20 |
| 2018/0349355 A1* | 12/2018 | Shi | G06F 40/289 |

OTHER PUBLICATIONS

Kishore et al., "Multiple Data Document Summarization," 2017 Conference on Information and Communication Technology (CICT'17), 7 pages. (Year: 2017).*

Shan et al. "The Pipeline: A wide-ranging, unabashedly honest conversation about why tech companies aren't diverse—and how to fix them," The California Sunday Magazine, May 31, 2018, 22 pages. https://story.californiasunday.com/tech-pipeline-diversity.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

Bhide et al., "Comment-Based Article Augmentation," U.S. Appl. No. 16/511,344, filed Jul. 15, 2019.

List of IBM Patents or Patent Applications Treated as Related, Signed Jul. 15, 2019, 2 pages.

\* cited by examiner

COMMENT-BASED ARTICLE AUGMENTATION

BACKGROUND

The present disclosure relates to document augmentation and more specifically to automatic augmentation of digitally published documents based on user commentary.

Digitally published articles (e.g., news articles, magazine articles, blog posts, etc.) commonly include an option for readers to post comments. There can also be options to sort the comments by date posted or by popularity amongst other readers. The comments can include information that may be of interest to the article's author, publisher, and readers. For example, a comment may provide additional information or a correction to the article. Comments can also contain questions and opinions about the article.

SUMMARY

Various embodiments are directed a method, which includes receiving an article and one or more comments, extracting comment elements from the comments, and extracting article elements from the article. The method also includes generating alignment scores for comment-article pairs based on the extracted comment and article elements. Further, the method includes determining that at least one comment-article pair has an alignment score at or above a threshold alignment score, and in response to the determining, generating at least one augmentation feature. The method can also include generating a marked-up version of the article, saving an earlier version of the article, and displaying a link to the earlier version on a user interface. In some embodiments, the augmentation feature is a visual link between a comment and a related portion of the article. The augmentation feature can also be generated text automatically added to the article. The generated text can summarize at least one comment from the comments. The alignment scores can be generated based on a measure of topic similarity for the comment-article pairs. A comment-article pair can include portions from the comments and the article.

Further embodiments are directed to a system, which includes at least one processing component, at least one memory component, a user interface, and an augmentation module. The augmentation module includes an element extraction component configured to receive the article and one or more comments, and extract comment elements and article elements. The augmentation module also includes an analysis component configured to generate alignment scores for comment-article pairs based on the extracted comment and article elements. The analysis component is further configured to determine that at least one comment-article pair has an alignment score at or above a threshold alignment score. Additionally, the augmentation module includes a feature generator component configured to generate at least one augmentation feature. The feature generator component can be configured to generate a marked-up version of the article, save an earlier version of the article, and display a link to the earlier version on the user interface. The alignment scores can be generated based on a measure of topic similarity for the comment-article pairs. The augmentation feature can be a visual link between a comment and a related section of the article. The augmentation feature can also be generated text automatically added to the article. The generated text can summarize at least one comment from the comments. A comment-article pair can include portions from the comments and the article.

Additional embodiments are directed to a computer program product for augmenting an article. The computer program product includes a computer readable storage medium having program instructions that are executable by a processor to cause the device to perform a method. The method includes receiving the article and one or more comments, extracting comment elements from the comments, and extracting article elements from the article. The method also includes generating alignment scores for comment-article pairs based on the extracted comment and article elements. Further, the method includes determining that at least one comment-article pair has an alignment score at or above a threshold alignment score, and in response to the determining, generating at least one augmentation feature. The method can also include generating a marked-up version of the article, saving an earlier version of the article, and displaying a link to the earlier version on a user interface. In some embodiments, the augmentation feature is a visual link between a comment and a related portion of the article. The augmentation feature can also be generated text automatically added to the article. The generated text can summarize at least one comment from the comments. The alignment scores can be generated based on a measure of topic similarity for the comment-article pairs. A comment-article pair can include portions from the comments and the article.

DETAILED DESCRIPTION

Digitally published articles are text documents that have been published on an internet platform, such as a digital edition of a newspaper or magazine, a blog, a commercial website, etc. The internet platform commonly provides a comment section for the article. Some of the comments may be redundant, unreliable, or lacking in relevant information, while other comments can include useful content such as additional information, interesting opinions, or helpful corrections. This content is often of interest to the article's author, publisher, editor, and/or other readers.

However, the number of comments can become so large that it would be impossible for a human to review each comment for useful information within a reasonable timeframe. For example, articles frequently receive hundreds or even thousands of comments. In some instances, the comments can be sorted according to simple criteria such as date or popularity, but these criteria are not particularly helpful when a person wants to gather information from the comments. This causes users (e.g., article readers, authors, publishers, editors, etc.) to miss valuable information or waste time reading through large numbers of irrelevant comments. Additionally, internet platforms can provide supplemental information with an article, such as links to related content. However, this content is limited to what authors, publishers, and editors are aware of at the time of publication.

A method of automatically generating features to augment an article based on elements extracted from comments is disclosed herein. Elements from the article and comments are analyzed to identify related portions of the article and comments. For example, the topic of the article and key pieces of information from each paragraph or section can be identified and paired with similar information in the comments. Related comments can also be grouped together and optionally summarized. Augmentation features are generated based on this analysis. For example, comments can be visually linked to related portions of the article. Additional text and external links can also be automatically added to the article. Additionally, reports providing information extracted from the comments, such as common questions and opinions can be generated. Further, annotations can be added to comments, such as to indicate that a comment refers to an earlier version of the article.

Figure 1:
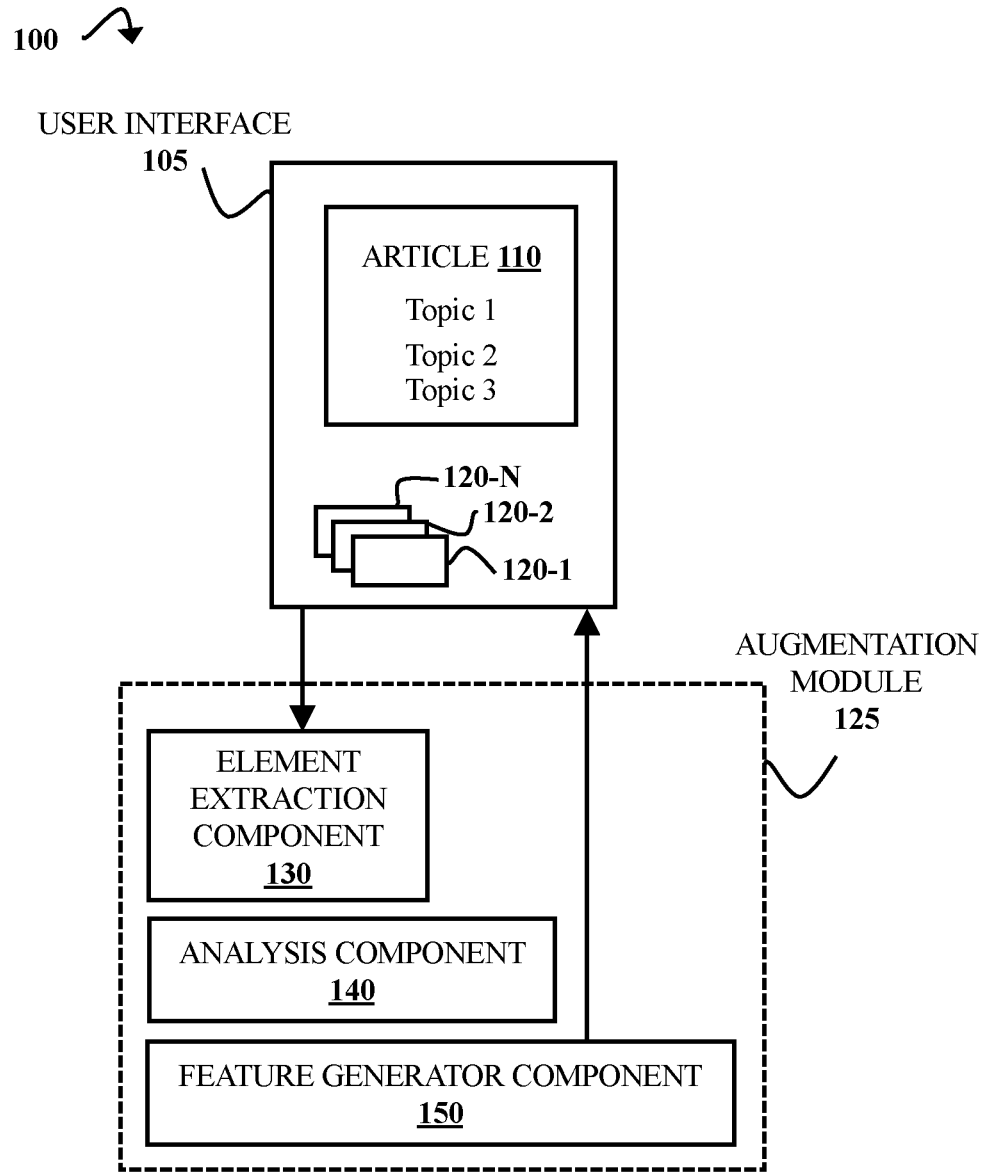
FIG. 1 is a block diagram illustrating a digitally published article environment.

FIG. 1 is a block diagram illustrating a digitally published article environment 100. The digitally published article environment 100 includes a user interface 105 for displaying an article 110 and comments 120-1, 120-2, 120-N (collectively, 120) on the article 110. The user interface 105 is displayed on a device (not shown) that provides visual and, optionally, audio data. Examples of a device such as this can include a desktop computer, a laptop computer, a mobile computing device, a tablet computer, etc. The display device can also be part of a standalone device, such as a computer monitor, television, or other display device, connected to a display system (illustrated in FIG. 3). The article 110 is a digitally published text document, such as a newspaper or magazine article, blog post, or any other digitally published text document that allows commentary (e.g., a product description on an ecommerce platform). Examples of comments 120 can include opinions, questions, corrections, answers to questions posed by the article 110 or other comments 120, product reviews, information to supplement the article, etc.

The digitally published article environment 100 also includes an augmentation module 125, which contains an element extraction component 130, an analysis component 140, and a feature generator component 150. The element extraction component 130 identifies and extracts elements from both the article 110 and the comments 120. The extracted elements are referred to herein as article elements and comment elements, respectively. Examples of article elements can include author information, publication date, complexity, version (e.g., article 110 as originally published or an edited version), content (e.g., data, statistics, factual statements), overall topic, section topics, style, readability, etc. Examples of comment elements can include commenter identities, style, topics addressed, posting date, dates of any edits to the comment, complexity, type of content (e.g., questions, corrections, opinions, etc.), readability, coherence, popularity, etc. Comment elements can also indicate whether a comment is a reply to another comment or if the comment has been edited after posting. Techniques for extracting article and comment elements are discussed in greater detail with FIG. 2.

The analysis component 140 evaluates the extracted elements in order to determine whether there are related elements in the article 110 and comments 120. The analysis component 140 generates alignment scores for pairs of comment 120 portions and article 110 portions based on values determined for the extracted elements. The pairs are referred to herein as comment-article pairs. For example, an alignment score can be based on a measure of topic similarity between a comment 120 portion and an article 110 portion. The portions can also include the full text of the article 110 as a whole or at least one of the comments of comments 120. For example, comment-article pairs can be the article 110 and every comment 120 that contains a question. Techniques and criteria for determining values and alignment scores are discussed in greater detail with respect to FIG. 2.

In an example where alignment scores are based on topic similarity, the article 110 can include three topics: topic 1, topic 2, and topic 3, each topic in a different portion (e.g., paragraph or section) of the article 110. A comment 120-1 that that is directed to topic 1 can be given a higher alignment score with the topic 1 article 110 portion than the topics 2 and 3 article 110 portions. If an alignment score is above a threshold alignment score, the comment-article element pair is considered an augmentation-eligible pair.

When there are augmentation-eligible pairs, the feature generator component 150 generates features to augment the article 110. However, there can also be an option to allow the feature generator component 150 to generate augmentation features for pairs with the highest alignment scores when no augmentation-eligible pairs are found. For example, a user can select an option for lowering the threshold alignment score. The type of features generated or displayed by the feature generator component 150 can be selected by a user in some embodiments. Threshold adjustments and feature type selections can be made via the user interface 105. Examples of augmentation features can include a reordered view of the comments 120, links between related comment 120 and article 110 portions, and/or additional article 110 content (e.g., text, links, citations, annotations, etc.). The feature generator component 150 can also generate reports with information about the article 110 and comments 120 (e.g., questions, corrections, common sentiments, etc.).

Continuing the example from above, when the topic 1 comment-article pair is an augmentation-eligible pair, the comment 120-1 related to topic 1 can be displayed in a text box or balloon when a reader hovers their cursor over the topic 1 article 110 portion or clicks on an icon to open or expand a text box. The comment 120-1 can also be displayed in other ways, such as automatically in the margin of the article 110. The feature generator component 150 can use any appropriate web page editing techniques to generate the augmentation features and display them on the user interface 105. Examples of augmentation features and web page editing techniques are discussed in greater detail with respect to FIG. 2.

Figure 2:
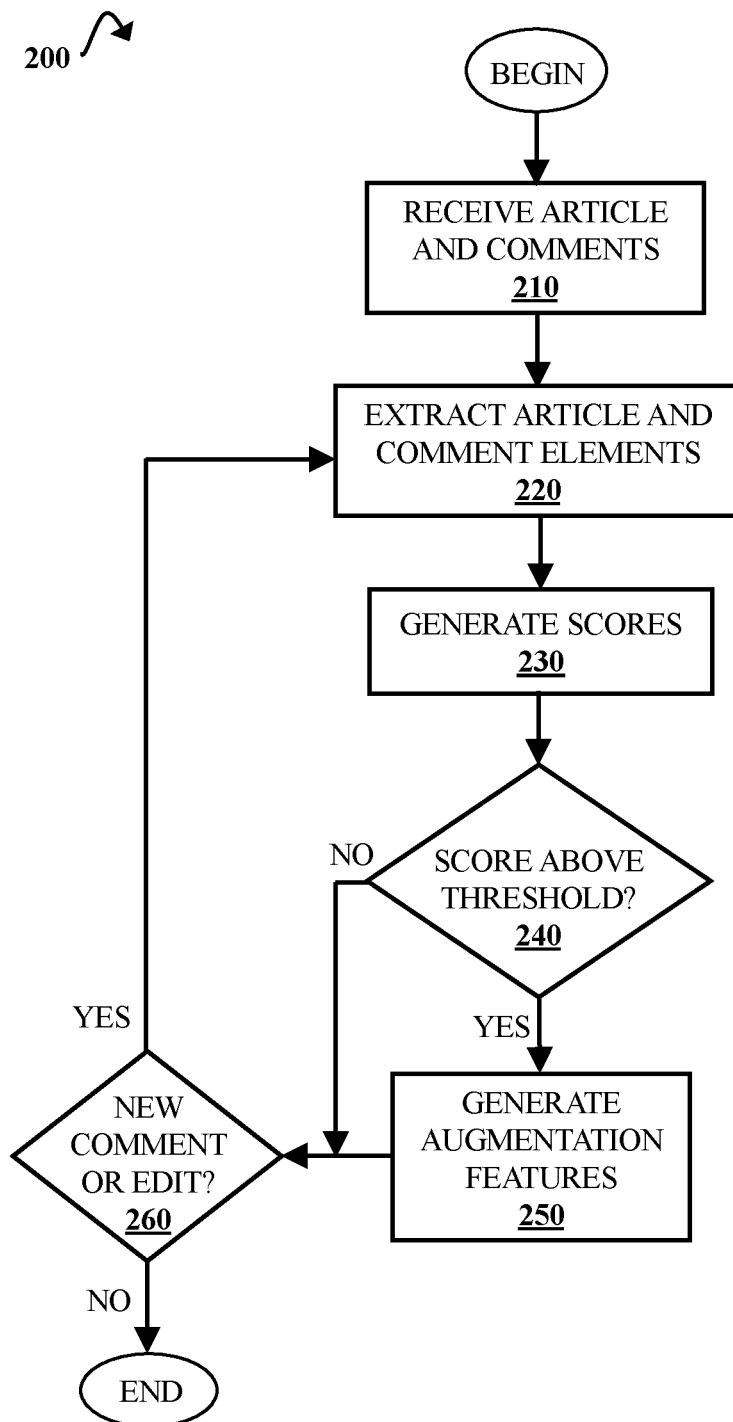
FIG. 2 is a flow diagram illustrating a process of augmenting a digitally published article, according to some embodiments of the present disclosure.

FIG. 2 is a flow diagram illustrating a process 200 of augmenting a digitally published article, according to some embodiments of the present disclosure. To illustrate process 200, but not to limit embodiments, FIG. 2 is described within the context of the digitally published article environment 100 of FIG. 1. Where elements shown in FIG. 2 are identical to elements shown in FIG. 1, the same reference numbers are used in both Figures.

Process 200 begins when the article 110 and one or more comments 120 on the article 110 are received. This is illustrated at step 210. The article 110 and comments 120 are displayed on the user interface 105. The comments 120 are entered by users through the user interface 105. A user is anyone who views the article 110, such as commenters or other readers of the article 110. Some users, such as the author, editor, or publisher of the article 110, can be authorized to manually edit the article 110 and/or feature generator component 150 settings. The authorized users can also request additional information and reports. Non-authorized users (e.g., readers) can optionally adjust the user interface 105 settings to add or remove augmentation features from view.

Comment and article elements are extracted from the comments 120 and article 110, respectively. This is illustrated at step 220. Examples of the comment and article elements can include author or commenter information, publication or posting date, editing dates, content (e.g., data, statistics, factual statements), topic, style, tone, sentiment, etc. The element extraction component 130 can extract the elements using any appropriate techniques. For example, elements can be identified and extracted using pre-trained recurrent neural networks (RNNs), such as Long Short Term Memory (LSTM) networks or Gated Recurrent Unit (GRU) networks. Additional techniques can include natural language processing (e.g., Hidden Markov models, statistical models, decision tree algorithms, supervised machine learning algorithms, semi-supervised machine learning algorithms, unsupervised machine learning algorithms, etc.), text mining, naïve Bayes classifiers, latent semantic indexing, etc.

In some embodiments, comment and article elements include the topics of portions of the comments 120 and article 110. Portions of the article 110 and comments 120 can be clustered into topics (e.g., using Latent Dirichlet Allocation (LDA) topic modeling, LDA with HMM, Latent Semantic Analysis, Probabilistic Latent Semantic Analysis (PLSA), etc.). Coherence between topics in the article 110 and comments 120 can be determined, as well as coherence between consecutive sentences in the article 110 and/or comments 120. Measures of coherence can include Normalized Pointwise Mutual Information (NPMI) similarity, Leacock-Chodorow similarity, Wu-Palmer similarity, Hirst-St. Onge similarity, Lesk similarity, Jiang-Conrath similarity, Resnik Information Content, Lin similarity, context vectors, Related Article Concept Overlap (RACO), etc.

The article and comment elements can be extracted by locating domain-specific terms (e.g., keywords or triples). A domain is a particular category, such as a topic, sentiment, field (e.g., science, journalism, fiction, etc.), or style. This extraction can also include context terms surrounding the domain-specific terms. Context can be determined by comparing text near domain-specific terms in the article 110 to text near domain-specific terms in the comments 120 (e.g., by cosine similarity of the text).

Comment and article elements can also include measures of complexity or readability. Techniques for measuring these elements can include Flesch-Kincaid readability tests and language models trained on complex text. Additional examples of readability tests can include the Dale-Chall readability formula, the Gunning Fog Index readability formula, the Fry readability formula, the Raygor readability estimate, the Laesbarheds Index (LIX), the Automated Readability Index (ARI), etc.

In some instances, the article 110 and/or comments 120 receive "votes" indicating popularity. For example, users can vote for the article 110 and comments 120 by clicking on an icon (e.g., an arrow pointed upward or a heart shape) or selecting a number of stars above a threshold number of stars (e.g., four out of five stars). In some embodiments, users can also give the article 110 and comments 120 negative votes. A negative vote can include clicking on another icon (e.g., an arrow pointed downward), selecting a number of stars below a threshold number of stars (e.g., two out of five stars), or unselecting a previous vote (e.g., by clicking on the voting icon a second time).

Additional comment and article elements can include elements related to the author of the article 110 and the commenters. This information can include location, field of interest, and field of expertise. For example, comments 120 written by commenters with expertise in topics addressed by the article 110 can be given higher alignment scores with sections of the article directed to these comments 102. Commenter information can also include number of comments 120 previously posted by the commenter, number of replies to other comments 120, popularity of posted comments 120, etc. The popularity of a comment 120 can be determined from the number of votes received, the number of replies, and/or from a text analysis technique to determine whether the replies are generally positive or negative. Text analysis of replies to comments 120 can also determine whether a question in a comment 120 has been answered in a reply.

Alignment scores are then generated for comment-article pairs. This is illustrated at step 230. An alignment score indicates the degree to which a portion of a comment 120 aligns with a portion of the article 110. The portions can include all or part of the text of a comment 120 or the article 110. Portions of comments 120 and the article 110 for which alignment scores are generated are referred to herein as comment-article pairs. Comment-article pairs having alignment scores at or above a threshold alignment scores are referred to as augmentation-eligible pairs. This is discussed in greater detail below. The analysis component 140 generates the alignment scores based on values determined for the article and comment elements extracted at step 220.

For example, alignment scores can be based on a measure of similarity or coherence between topic clusters in the comments 120 and topic clusters in the article 110. Similarity can be determined by comparing the topic clusters' membership distributions using a Kullback-Leibler (KL)-divergence metric. Additional examples of similarity measures that can be used are discussed in greater detail above. Alignment scores can also be based on readability. Comments 120 having scores above a minimum and/or below a maximum preset readability level can receive higher alignment scores for the article 110 as a whole. Higher alignment scores can be generated for comments 120 that are a closer match to the readability level of the article 110 (e.g., having a percent difference within threshold range) in other embodiments.

However, any appropriate values can be used to generate the alignment scores (e.g., a number of votes for each of the comments 120). In some embodiments, the alignment scores are based on values for more than one element. For example, two of the comments 120-1 and 120-2 can have identical alignment scores based on similarity. However, if comment 120-1 has a higher score for readability than comment 120-2, a comment-article pair that includes comment 120-1 can be given a higher overall alignment score.

It is then determined whether there are alignment scores above a threshold alignment score. This is illustrated at step 240. If a comment-article pair has an alignment score above a threshold alignment score, the comment-article element pair is considered an augmentation-eligible pair. In some embodiments, different augmentation features have different threshold scores. In an example where an alignment score is based on topic similarity, there can be a higher threshold score for generating a text balloon that positions comment 120-1 within the article 110 than for changing the position of a comment 120-1 within a comment section (e.g., moving the comment 120-1 closer to the top of the section). Additionally, threshold alignment scores can be raised or lowered by a user in some embodiments.

If one or more augmentation-eligible pairs are located at step 240, augmentation features are generated. This is illustrated at step 250. If no augmentation-eligible pairs are located at step 240, process 200 proceeds directly to step 260, wherein it is determined whether there are new comments 120 or article 110 changes. Step 260 is discussed in greater detail below. At step 250, the feature generation component 150 generates various augmentation features in response to determining that there are augmentation-eligible pairs. The features can be generated automatically. However, in some embodiments there is an option for users to turn the automatic feature generation on or off.

In some embodiments, the feature generator component 150 alters the user interface 105 (e.g., to visually link augmentation-eligible pairs, reorder or group together comments, add additional content to the article 110, etc.). For example, mark tags and hyperlinks can be added to the article 110 using hypertext markup language 5 (HTML 5). The augmented article 110 can be rendered without reloading the entire web page via user interface programs such as AJAX (Asynchronous JavaScript And eXtensible Markup Language (XML)).

The feature generator component 150 can also perform an external information search (e.g., of trusted web sources or related archived articles) according to a policy framework in the system. The external search can locate supplemental information related to a topic shared by an augmentation-eligible pair. In some embodiments, a link to a relevant information source is added to the article 110 (e.g., in the article 110 text or elsewhere on the user interface 105). Supplemental information can also be automatically added to the article 110 in the form of text generated using conditional variable autoencoders (CVAEs) or any appropriate text-generation technique (e.g., neural networks and conditional language models).

The supplemental information added in the form of generated text can come from the external information search or from comments 120. For example, similar comments 120 that have been grouped together can be summarized in generated text, which is then added to the article 110 text. In other embodiments, generated text can be inserted in a text balloon, in the margins, or elsewhere on the user interface 105. When text is added, the previous version of the article is saved 110, and a marked-up version is generated. The marked-up version can distinguish the generated text from the original text by highlighting the generated text, using different colors for original text and generated text, etc. A link to the original version of the article 110 can also be provided. In some embodiments, a new version of the article 110 is generated in which there is no visual distinction between original and generated text. However, links to the original and marked-up versions of the article 110 can also be provided. Additionally, in some embodiments the original article 110 is displayed by default, but links to a marked-up version and, optionally, a new version are provided on the user interface 105 as well.

Users can adjust the type of augmentation features that are generated and/or displayed in some embodiments. For example, a user can select an option for only providing augmentation features based on topic alignment of comment-article pairs and popularity of comments 120. Users can also select an option for displaying generated text as new text within the article 110 or apart from the article 110 (e.g., text balloons). Another display option can include selecting whether an original, marked-up, or new version of the article 110 is displayed by default. Techniques for determining the popularity of comments 120 are discussed in greater detail above. In another example, the authorized user can select an option for only generating augmentation features when there are comments 120 that include questions. These augmentation features can include visually linking the question to a portion of the article 110 that contains an answer to the question. The augmentation features can also include automatically notifying the author or publisher of the article 110 about the question. Additionally, comments 120 with questions can be moved to a question section on the user interface 105 or a frequently asked questions page.

The augmentation features can allow a user to view related comments 120 while reading the corresponding portion of the article 110. For example, when an augmentation-eligible pair that includes a comment 120-1 and a portion of the article 110 with a high degree of topic similarity, the comment 120-1 can be moved so that it is displayed near the paired portion of the article 110. If the augmentation-eligible pair instead includes the comment 120-1 and the entire article 110, the comment 120-1 can optionally be moved to the top (e.g., closest to the article) of a comment section in the user interface 105.

In another example, the comment 120-1 can be moved to the top of a comment section based on elements such as readability or coherence. Further, when multiple comments 120 form augmentation-eligible pairs with the same article 110 portion (e.g., based on topic similarity), the paired comments 120 can be grouped together. A summary of the grouped comments 120 can optionally be provided. The grouped comments 120 can also be sorted based on readability or coherence. In some embodiments, comments 120 that are not part of augmentation-eligible pairs are removed or hidden from view.

The feature generator component 150 can also generate a report for a user, which can include information such as an overview of the comment elements, such most common opinions or questions, overall tone (e.g., positive or negative), etc. The report can also identify which portions of the article 110 elicited various comments, questions, or corrections. In some embodiments, only authorized users can receive reports (e.g., automatically or by request). The report can include recommended changes that the authorized user can make to the article 110. Changes can include making corrections, adding or deleting text, answering questions, replying to comments, etc. The feature generator component 150 can also generate a supplemental information report based on an external information search.

Each time an augmentation feature is added to the article 110, a previous version of the article 110 can be saved. In some embodiments, users can access previous versions of the article 110 and/or marked-up versions indicating what changes have been made by the feature generator component 150. The user interface 105 can display the original publication date and the date on which the augmented version of the article 110 was posted. The user interface 105 can also indicate what was changed in the augmented version (e.g., by displaying a message indicating that an error was corrected). The authorized user can optionally remove all or part of the augmentation features from the article 110. In some embodiments, comments 120 can be annotated to indicate that they refer to an earlier version of the article 110. Additional examples of version control options are discussed in greater detail above.

If no augmentation-eligible pairs are located at step 240, the analysis component 140 determines whether there are new comments 120 or article 110 edits. This is illustrated at step 260. If at least one new comment 120 or edit to the article 110 (e.g., added or removed text) is found, process 200 returns to step 220, whereupon new article elements and comment elements are extracted. Process 200 then continues until no new comments 120 or changes to the article 110 are found at step 260. When no new comments 120 are found, or when instructions to stop have been received, process 200 ends.

Figure 3:
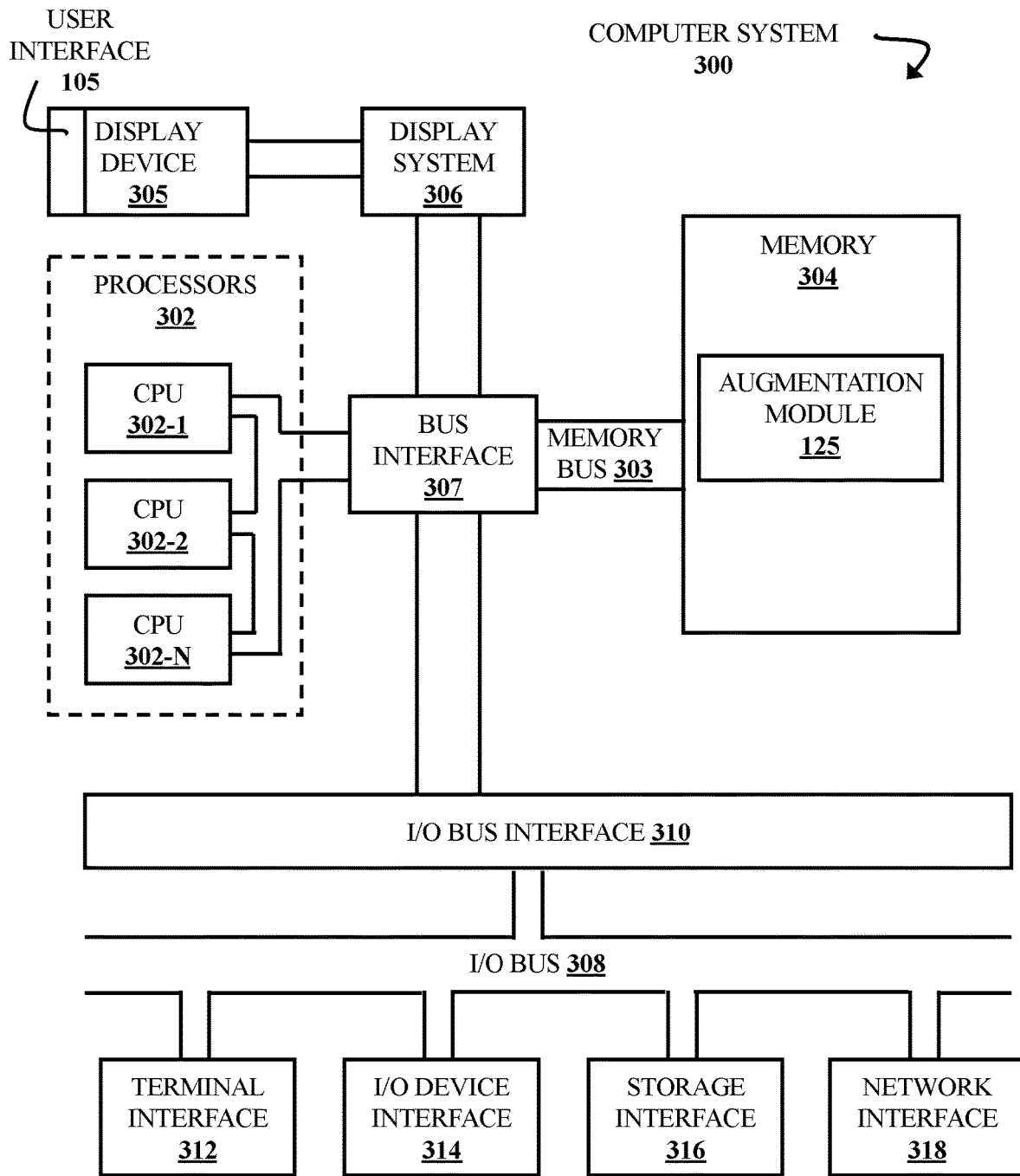
FIG. 3 is a block diagram illustrating a computer system, according to some embodiments of the present disclosure.

FIG. 3 is a high-level block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 310 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300, and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 304 also contains an augmentation module 125, which includes an element extraction component 130, an analysis component 140, and a feature generator component 150 (illustrated in FIG. 1).

These components are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the augmentation module 125 is illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the augmentation module 125 includes instructions that execute on the processor 302 or instructions that are interpreted by instructions that execute on the processor 302 to carry out the functions as further described in this disclosure. In another embodiment, the augmentation module 125 is implemented in hardware via semiconductor devices, chips, logical gates, circuits, circuit cards, and/or other physical hardware devices in lieu of, or in addition to, a processor-based system. In another embodiment, the augmentation module 125 includes data in addition to instructions.

Although the memory bus 303 is shown in FIG. 3 as a single bus structure providing a direct communication path among the CPUs 302, the memory subsystem 310, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305, which displays a user interface 105 for viewing, publishing, and editing an article 110 and comments 120 (illustrated in FIG. 1). The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface, but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
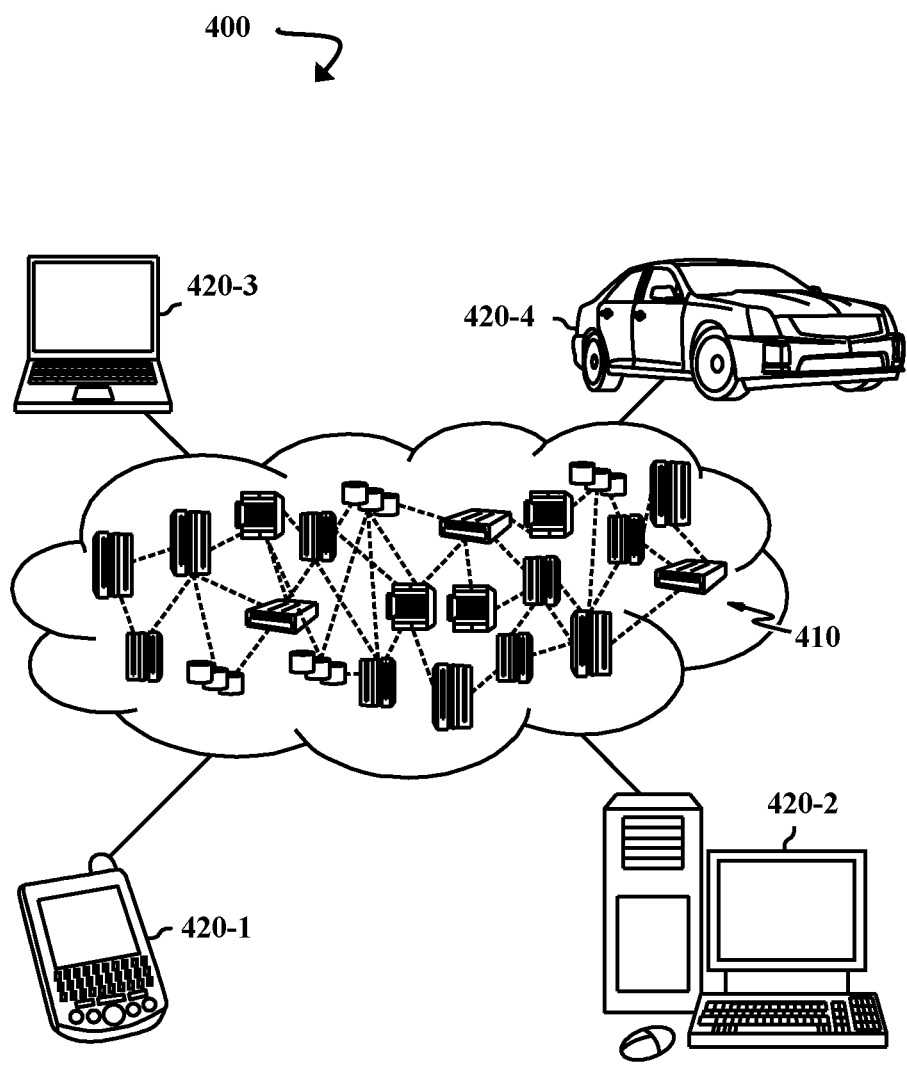
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
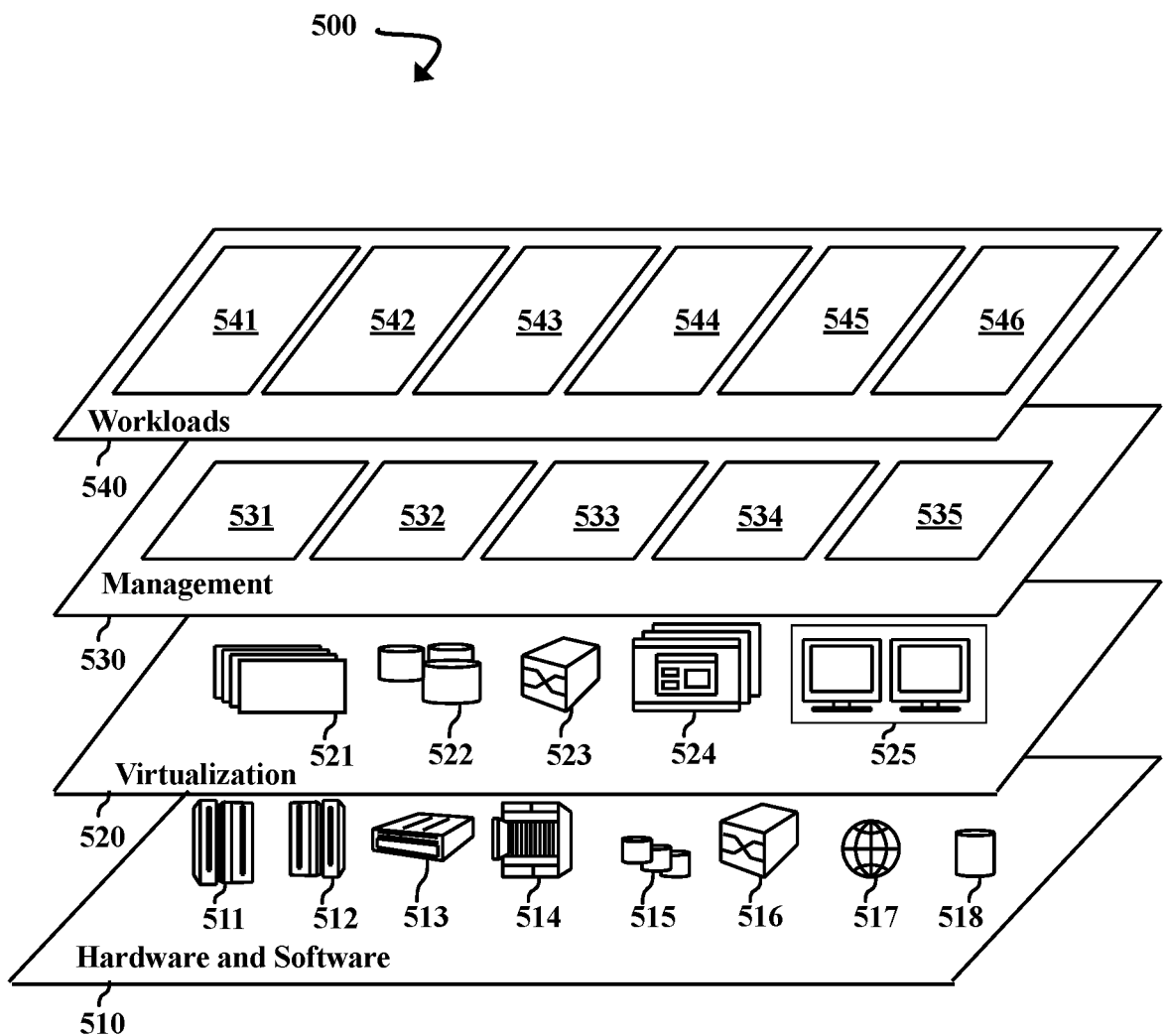
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and augmentation of a digitally published document based 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system, comprising:
   at least one processing component;
   at least one memory component;
   a user interface; and
   an augmentation module, comprising:
      an element extraction component configured to:
         receive an article;
         receive one or more comments;
         extract comment elements from the one or more comments; and
         extract article elements from the article;
      an analysis component configured to:
         generate alignment scores for comment-article pairs based on the extracted comment elements and the extracted article elements; and
         determine that at least one of the comment-article pairs has an alignment score at or above a threshold alignment score; and
      a feature generator component configured to:
         generate at least one augmentation feature in response to the determining, wherein the generating the at least one augmentation feature comprises:
            locating, by an automatic search of external sources, supplemental information related to the at least one of the comment-article pairs;
            automatically generating text that conveys the supplemental information; and
            adding the at least one augmentation feature to the article.

2. The system of claim 1, wherein the generating the at least one augmentation feature further comprises adding a visual link between at least one comment from the one or more comments and a related section of the article.

3. The system of claim 1, wherein the generating the at least one augmentation feature further comprises:
   automatically generating additional text; and
   automatically adding the additional generated text to the article.

4. The system of claim 3, wherein the additional generated text summarizes at least one comment from the one or more comments.

5. The system of claim 1, wherein each of the comment-article pairs includes at least one portion of at least one comment from the one or more comments and at least one portion of the article.

6. The system of claim 1, wherein the feature generator component is further configured to:
   generate a marked-up version of the article;
   save an earlier version of the article; and
   provide a link to the earlier version of the article on the user interface.

7. The system of claim 6, wherein the marked-up version of the article includes the generated text and text from the earlier version of the article.

8. The system of claim 7, wherein the generated text is visually distinguished from the text from the earlier version of the article.

9. The system of claim 1, wherein the feature generator is further configured to generate a supplemental information report.

10. A computer program product for augmenting an article, the computer program product comprising a computer readable storage medium having program instructions embodied therewith, the program instructions executable by a processor to cause a device to perform a method, the method comprising:

receiving the article;

receiving one or more comments;

extracting comment elements from the one or more comments;

extracting article elements from the article;

generating alignment scores for comment-article pairs based on the extracted comment elements and the extracted article elements;

determining that at least one of the comment-article pairs has an alignment score at or above a threshold alignment score; and in response to the determining, generating at least one augmentation feature, wherein the generating the at least one augmentation feature comprises:

locating, by an automatic search of external sources, supplemental information related to the at least one of the comment-article pairs;

automatically generating text that conveys the supplemental information; and adding the at least one augmentation feature to the article.

11. The computer program product of claim 10, wherein the generating the at least one augmentation feature further comprises adding a visual link between at least one comment from the one or more comments and a related section of the article.

12. The computer program product of claim 10, wherein the generating the at least one augmentation feature further comprises:

automatically generating additional text; and automatically adding the additional generated text to the article.

13. The computer program product of claim 12, wherein the additional generated text summarizes at least one comment from the one or more comments.

14. The computer program product of claim 10, wherein the alignment scores are generated based on a measure of topic similarity for the comment-article pairs.

15. The computer program product of claim 10, wherein each of the comment-article pairs includes at least one portion of at least one comment from the one or more comments and at least one portion of the article.

16. The computer program product of claim 10, further comprising:

generating a marked-up version of the article;

saving an earlier version of the article; and providing a link to the earlier version of the article on a user interface.

\* \* \* \* \*